United States Patent
Von Gynz-Rekowski et al.

(10) Patent No.: US 9,803,689 B2
(45) Date of Patent: Oct. 31, 2017

(54) BEARING TOOLS AND PROCESS

(75) Inventors: Gunther H H Von Gynz-Rekowski, Montgomery, TX (US); Joseph Edward Adams, III, New Waverly, TX (US); Kevin Anthony Tomczak, New Waverly, TX (US)

(73) Assignees: United Machine Works, Inc., New Waverly, TX (US); Ashmin, L.C., Conroe, TX (US)

( * ) Notice: Subject to any disclaimer, the term of this patent is extended or adjusted under 35 U.S.C. 154(b) by 987 days.

(21) Appl. No.: 12/288,674

(22) Filed: Oct. 22, 2008

(65) Prior Publication Data

US 2009/0044409 A1 Feb. 19, 2009

Related U.S. Application Data

(63) Continuation-in-part of application No. 11/157,730, filed on Jun. 21, 2005, now Pat. No. 7,882,638.

(51) Int. Cl.
*F16C 33/14* (2006.01)
*B21D 53/10* (2006.01)
*E21B 4/00* (2006.01)

(52) U.S. Cl.
CPC .............. *F16C 33/14* (2013.01); *B21D 53/10* (2013.01); *E21B 4/003* (2013.01); *F16C 2220/60* (2013.01); *F16C 2223/46* (2013.01); *F16C 2352/00* (2013.01); *Y10T 29/49689* (2015.01)

(58) Field of Classification Search
CPC .. F16C 33/14; F16C 2352/00; F16C 2223/46; F16C 2220/60; E21B 4/003; B21D 53/10; B21D 53/00; Y10T 29/49689

USPC ................ 29/898.12; 427/532–579; 508/103
See application file for complete search history.

(56) References Cited

U.S. PATENT DOCUMENTS

| | | | | |
|---|---|---|---|---|
| 3,409,966 A | * | 11/1968 | Hilbish | F16C 33/12 29/423 |
| 5,194,237 A | * | 3/1993 | Cliche et al. | 423/440 |
| 5,385,407 A | * | 1/1995 | De Lucia | 384/97 |
| 5,942,289 A | * | 8/1999 | Jackson | 427/398.2 |
| 6,303,897 B1 | * | 10/2001 | Bady et al. | 219/121.65 |
| 6,561,290 B2 | * | 5/2003 | Blair | E21B 4/003 175/107 |
| 6,861,612 B2 | * | 3/2005 | Bolton et al. | 219/121.64 |
| 6,881,451 B2 | * | 4/2005 | Heinemann et al. | 427/554 |
| 6,888,088 B2 | * | 5/2005 | Bolton et al. | 219/76.1 |

(Continued)

OTHER PUBLICATIONS

Lincoln Electric, "What is Preheat?" Ret. Jun. 16, 2014. 2 Pages. <http://www.lincolnelectric.com/en-us/support/process-and-theory/pages/preheat-detail.aspx>.*

*Primary Examiner* — Jacob Cigna

(57) ABSTRACT

Methods for manufacturing bearings and wear resistant surfaces usable in various downhole tools are described herein. A housing is provided. A laser configured for insertion into the housing, such as an inner diameter laser, is used to connect a fusible material to the inner surface of the housing or an insert disposed therein to form a hard facing layer on the inner surface. Simultaneously or independently, the laser can be used to connect the fusible material to the outer surface of a mandrel within the housing to form a second hard facing layer. The present methods thereby produce durable radial bearings having extended operational life, which can be produced within a bearing housing, or externally for transport and installation in existing bearing housings.

29 Claims, 2 Drawing Sheets

(56) References Cited

U.S. PATENT DOCUMENTS

| | | | |
|---|---|---|---|
| 8,795,794 B2* | 8/2014 | Dezert | E21B 4/003 29/898.04 |
| 2002/0098298 A1* | 7/2002 | Bolton | C23C 24/08 427/596 |
| 2004/0157066 A1* | 8/2004 | Arzoumanidis | 428/472 |
| 2004/0157750 A1* | 8/2004 | Danly et al. | 508/103 |
| 2005/0145417 A1* | 7/2005 | Radford et al. | 175/57 |
| 2006/0283017 A1* | 12/2006 | von Gynz-Rekowski | 29/898.04 |

* cited by examiner

BEARING TOOLS AND PROCESS

CROSS-REFERENCE TO RELATED APPLICATIONS

The present application is a continuation-in-part application, which claims priority to the U.S. patent application having Ser. No. 11/157,730, filed Jun. 21, 2005 now U.S. Pat. No 7,882,638, the entirely of which is incorporated herein by reference.

FIELD

The present embodiments relate, generally, to bearings and wear resistant services and processes for producing bearings and wear resistant surfaces for use in downhole tools and products, including but not limited to radial and linear bearings for downhole turbines, jaws, motors, and other similar apparatuses, the manufacturing processes usable both within a bearing housing and external to a bearing housing.

BACKGROUND

When drilling a well, a downhole motor is used to provide a rotational force to a drill bit via a rotating drive shaft, also called a mandrel. The mandrel is rotated within a bearing housing. The rotation of the mandrel relative to the bearing housing can create significant amounts of friction, which can quickly wear down components, and can cause deformation, overheating, and other types of damage.

Bearing assemblies have been developed to compensate for these difficulties, conventional bearing assemblies being usable to resist and withstand the friction created when a central shaft rotates within a housing. Prior techniques and assemblies include use of a coating process about the mandrel and inner diameter of the housing, use of carbide inserts, and use of standard roller and ball bearings. Prior coating techniques include various means for applying a facing surface to a bearing, such as welding, spraying, plating, or various manual techniques.

Prior coating processes generally include adhesion and fusion processes. Fusion is typically more reliable than adhesion due to the fact that when fusion is used, a coating material is melted partially into the carrier metal to form a superior bond. Use of fusion normally requires a significant amount of heat, in excess of 800 or 900 degrees Fahrenheit, to melt the surface of materials, which can often disadvantageously affect the metallurgical properties of the bearing housing, mandrel, and other components subjected to the high temperatures. In addition, extreme heat can dilute the fused material into the substrate, causing undesired intermingling and creating an unsuitable coating.

Further, fusion processes require large apparatuses for application of material and for heating, causing the performance of fusion operations to be impossible within restricted spaces, such as surfaces within an assembled bearing housing.

As a result, conventional bearings often have a first hard facing surface disposed over a mandrel, formed using a fusion process, while a second opposing hard facing surface disposed along the inner surface of the bearing housing is formed using a differing material and/or a differing process. Often, the exterior hard facing surface along a housing member is worn out more quickly than the interior hard facing surface along a drive shaft, limiting the useful life of a conventional radial bearing to about 300 operating hours, requiring frequent costly and time consuming replacement.

Attempts to overcome this difficulty have typically focused on the types of materials used to form bearing surfaces, however attempted improvements to bearings and wear resistant surfaces have resulted in only negligible increases in the operational life of these surfaces due to the difficulties inherent in forming a fused hard facing surface along the interior of a housing.

Other prior attempts to overcome these difficulties have included use of a "dummy" tubular sleeve, over which interior facing materials and an external layer can be applied and fused together, using the same process and materials. The tubular sleeve can then be machined and/or ground away, so that only the interior facing layer and the external layer remain. The resulting product can then be installed over a mandrel within a bearing housing, however use and destruction of an additional tubular sleeve is a time-consuming and costly process.

A need exists for a method for producing a radial bearing or similar wear resistant surface, the method being usable within a bearing housing, thereby eliminating the need for a "dummy" tubular sleeve and related manufacturing steps, such as shrink-fitting components to engage the tubular sleeve, thereby significantly reducing the time and cost required for manufacture of the radial bearing or wear resistant surface. Additionally, the production of a wear resistant surface within a bearing housing, eliminating the need for bulky inserts, would conserve space within the housing, enabling a mandrel having a greater diameter to be installed for accommodating high torque and/or side loading applications.

A further need exists for a method for producing a radial bearing or similar wear resistant surface using fusion to associate an interior facing layer with an external layer, providing a radial bearing capable of high side load applications and a useful life of 1200 to 1500 operating hours, or more, as compared to a useful life of 300 operating hours for a conventional radial bearing or wear resistant surface.

A need also exists for a method for producing a radial bearing or similar wear resistant surface having opposing hard facing layers using comparatively low energy, which maintains the temperature of the bearing housing and other components as low as 400 degrees Fahrenheit, or less, to avoid changing the metallurgical properties of the components.

The present embodiments meet these needs.

SUMMARY

In an embodiment, the present method can include providing a housing having a matching member installed therein. A first hard facing layer can be mounted over the outer surface of the matching member, and a second hard facing layer can be concentrically disposed over the first hard facing layer, mounted within the inner surface of the housing.

In a further embodiment, the present method includes providing a bearing housing having a mandrel installed therein. A laser configured for insertion into the bearing housing is provided, such that the laser beam or a portion of the laser is inserted into the bearing housing.

In another embodiment, the present method can include providing a bearing sleeve having a mandrel installed therein. A laser configured for insertion into the bearing sleeve can be provided, such that the laser beam or a portion of the laser is inserted into the bearing housing.

In an embodiment, the laser can include an inner diameter laser, such as a high power direct diode laser, which advantageously requires less energy to operate than larger lasers, thereby applying less heat to the bearing housing and/or the mandrel. As a result, the bearing housing, the mandrel, and other associated components can be retained at a temperature of 400 degrees Fahrenheit, or less, preventing negative changes to the metallurgical properties of the components that can be caused by excessive heat. Further, during operation, an inner diameter laser produces a very small affected zone, heating only a very small area of the mandrel and/or the bearing housing when used, further avoiding any disadvantageous metallurgical affects.

In an alternate embodiment, a plasma transferred arc device can be provided in lieu of a laser.

A fusible material, which can include any material able to be connected to another material through a fusion process, is applied to the inner surface of the housing and to the outer surface of the mandrel, or to other base surfaces used in lieu of a mandrel and/or bearing housing, while using the laser to heat and melt the base material of the base surface locally, creating a puddle, such that the fusible material is positioned into the puddle, heated, and melted, thereby connecting the fusible material with the base material. In an embodiment, the fusible material can include a powder containing tungsten carbide, cobalt, nickel, silicon carbide, ceramic, other hard facing materials, or combinations thereof. A first hard facing layer is thereby formed over the outer surface of the mandrel, while a second hard facing layer is formed over the inner surface of the bearing housing. In an embodiment, the fusible material can be projected toward the point of contact between the laser and the bearing surface under an inert gas, such as nitrogen, helium, krypton, argon, or other similar inert gases.

The hard facing layers can then be machined, using any conventional machining technique, to form opposing hard facing surfaces.

Throughout the process, the temperature of the bearing housing, the mandrel, and all associated components can be retained at or below 400 degrees Fahrenheit.

In an embodiment, a male bearing insert can be disposed over the mandrel, and/or a female bearing insert can be disposed over the male bearing insert and inserted into a bearing housing, and the respective inner and outer surfaces of the inserts can have the hard facing layers formed thereon. The male and female bearing inserts, the bearing housing, and/or the mandrel can include any material sufficiently durable to withstand the temperature and pressure of downhole operations, and sufficiently ductile to absorb the shock and load of the drilling process, such as carbon steel, stainless steel, inconel, aluminum, other similar metals, or combinations thereof.

In a further embodiment, the present method can include manufacturing a hard facing layer by engaging a first bearing layer, disposed within a bearing housing, with a fusible material, while using a laser to heat the fusible material to form a first hard facing layer. A second hard facing layer can be separately provided to form a radial bearing. In an embodiment, a second bearing layer can be simultaneously or alternatively engaged with the fusible material while heating using the laser to form a second hard facing layer over the second bearing layer. The hard facing layers can then be machined to form suitable hard facing surfaces.

The present embodiments also relate to an alternate method for manufacturing a radial bearing. A bearing housing and a mandrel are provided, as described previously. A first bearing layer is mounted over the outer surface of the mandrel, and a second bearing layer is provided over the first bearing layer, mounted within the inner surface of the bearing housing.

A laser, as described previously, is inserted into the bearing housing, and a fusible powder is applied to the first and second bearing layers while using the laser to connect the fusible powder to the bearing layers, thereby forming hard facing layers on the bearing layers. The hard facing layers are then machined to form opposing hard facing surfaces.

Through use of a laser cladding fusion process, a very strong metallurgical bond is provided between the resulting bearing/wear resisting layers and base material surfaces, forming a high-performance bearing capable of high torque and side load applications, having an extended operational life expectancy. Additionally, laser fusing enables the bearing/wear resisting layers to be fused to the base material surfaces using a minimum of energy, while affecting only a small zone of the base surfaces on which the hard facing layers are formed, thereby minimizing the dilution of the fusible material into the base surfaces, regardless of the speed at which the fusion process is performed. The small area of the bearing layer that is affected by the heating serves to strengthen the bond between the hard facing surface and the bearing layer. Further, use of a controlled laser can provide lower porosity surfaces having a uniform thickness and finish, reducing or eliminating the need for any post-machining steps and resulting in an optimal coating with well-controlled thickness.

The present methods are thereby usable to manufacture a radial bearing efficiently and cost-effectively, within a bearing housing, the radial bearing having a useful life expectancy of 1200 to 1500 operating hours, or longer.

Additionally, due to the ability of the present methods to form a coating of a controllable thickness directly to a base surface on a mandrel and/or a bearing housing, conventional bulky inserts are not required, thereby conserving a considerable quantity of usable space within the bearing housing. This feature of the present invention allows a mandrel having a larger diameter to be utilized within the bearing housing, enabling mud motors that incorporate bearings produced using the present methods to perform higher torque and side loading applications.

BRIEF DESCRIPTION OF THE DRAWINGS

In the detailed description of the embodiments presented below, reference is made to the accompanying drawings, in which.

The present embodiments are detailed below with reference to the listed Figures.

DETAILED DESCRIPTION OF THE EMBODIMENTS

Before explaining the present embodiments in detail, it is to be understood that the embodiments are not limited to the particular descriptions and that the embodiments can be practiced or carried out in various ways.

Figure 1:
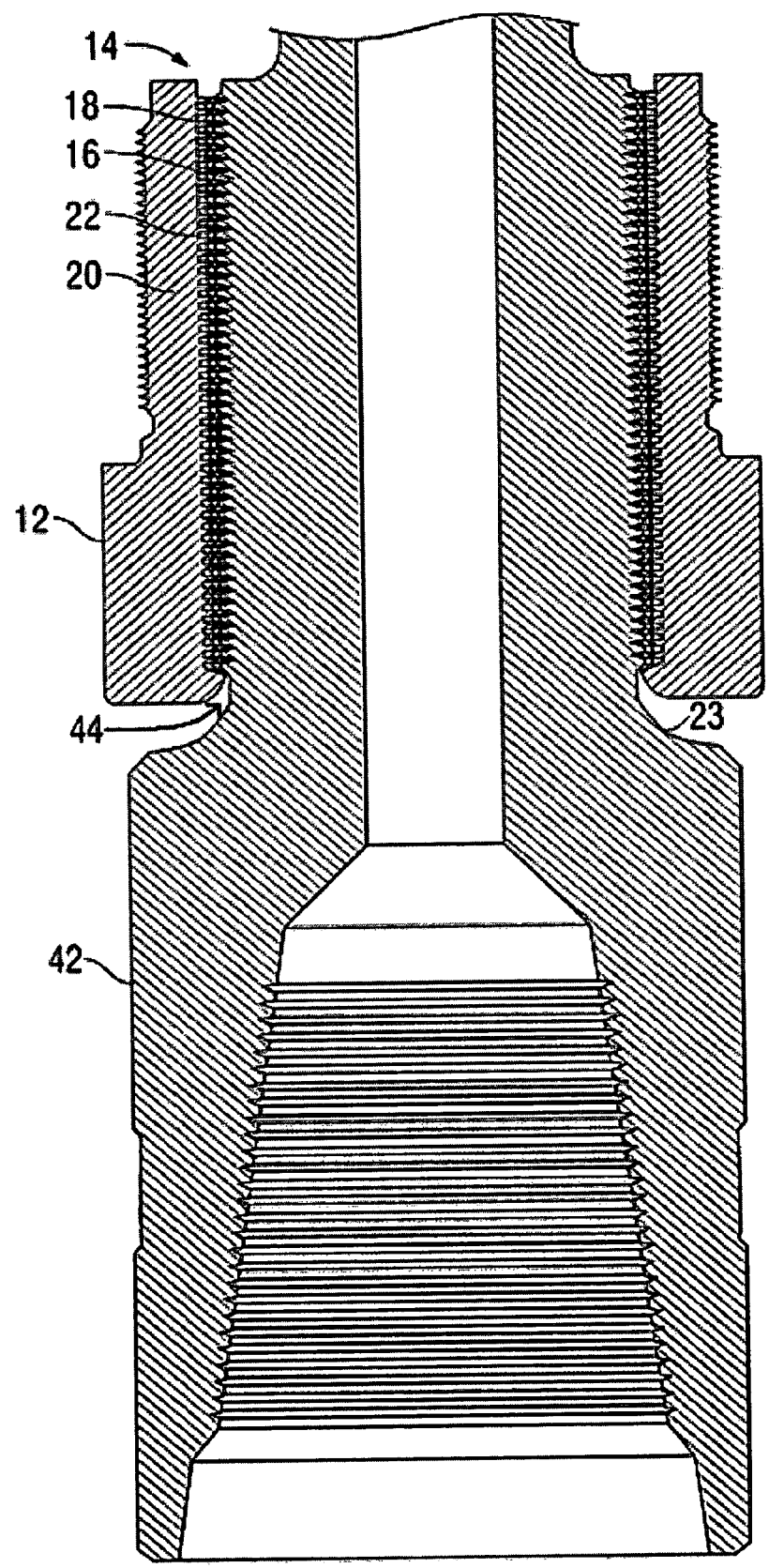
FIG. 1 depicts a cross-sectional view of a mandrel disposed in a bearing housing containing bearings manufactured through use of the present embodiments.

Referring now to FIG. 1, a cross-sectional view of a mandrel (42) disposed within a bearing housing (12) is depicted. The mandrel (42) is configured for engagement with a drill bit and is designed to rotate within the bearing housing (12) while the bearing housing (12) remains stationary, thereby imparting rotational force to the drill bit to enable drilling of a well.

To prevent damage to the mandrel (42), the bearing housing (12), and/or any other attached components or equipment, a radial bearing (14) is depicted installed concentrically about the mandrel (42), within the bearing housing (12). While FIG. 1 depicts a radial bearing installed within a bearing housing, it should be noted that the present embodiments can be used to form similar wear resistant surfaces for a variety of downhole tools and other applications, in addition to radial bearings for protecting a downhole mud motor.

The mandrel (42) is shown having an outer surface (23) with a first bearing layer (16) disposed thereon. The first bearing layer (16) can be integral with the mandrel (42), welded to the mandrel (42), or secured using other means, such that the first bearing layer (16) rotates concurrent with the rotation of the mandrel (42) during drilling operations. For purposes of this application, the term mandrel includes all components engaged with the mandrel that experience rotatable and/or slidable motion concurrent with the mandrel.

The first bearing layer (16) has a first hard facing surface (18) formed thereon. The first hard facing surface can be formed by fusing a powdered fusible material, such as tungsten carbide, silicon carbide, cobalt, nickel, ceramic, and/or other similar materials, then machining the resulting layer to form the first hard facing surface (18).

A second bearing layer (20) is shown concentrically disposed over the first bearing layer (16), mounted within the bearing housing (12). The second bearing layer (20) can be secured integral with the inner surface of the bearing housing (12), or secured to the bearing housing (12) using welding or similar means, such that the second bearing layer (20) remains stationary with respect to the mandrel (42) and the first bearing layer (16) during.

The second bearing layer (20) has a second hard facing surface (22) formed thereon, which can be produced using materials and processes similar to those of the first hard facing surface (18).

The hard facing surfaces (18, 22) can be formed along their respective bearing layers (16, 20) within the bearing housing (12) through use of a laser (44) adapted for insertion into the bearing housing (12), such as an inner diameter laser. Alternatively, a plasma transfer arc technique could also be used to fuse a powdered fusible material to the bearing layers (16, 20). The mechanical and physical properties of the second bearing layer (20) and second hard facing surface (22) can be similar to those of the first bearing layer (16) and first hard facing surface (18), or the differing bearing layers (16, 20) and hard facing surfaces (18, 22) can have differing properties. For example, in an embodiment, the second hard facing surface (22) within the bearing housing (12) can be formed using an inner diameter laser, while the first hard facing surface (18) on the mandrel (42) is formed using other means, resulting in hard facing surfaces having differing properties.

However, it is an advantage of the present invention that opposing hard facing surfaces (18, 22) associated with both the mandrel (42) and the bearing housing (12) can be formed using similar materials and processes, ensuring an approximately equal operational life and even wear on both hard facing surfaces (18, 22). Typically, the interior hard facing surface of a conventional radial bearing housing will wear down and fail before the exterior hard facing surface along the mandrel requires replacement.

Through use of the described processes, the bearing layers (16, 20) and hard facing surfaces (18, 22) can be substantially thinner than conventional bearing materials, conserving space within the bearing housing (12), thereby enabling the mandrel (42) to have a diameter greater than those used in conventional bearing assemblies. The improved thickness of the mandrel (42) enables the mandrel (42) to be utilized for applications requiring greater stress and/or higher torque.

The formation of the hard facing surfaces can be performed by maneuvering the laser and fusible material from a first end of a radial bearing to a second end. However, when providing a wear resistant surface to a component having a smaller diameter-to-length ratio, which can be more significantly affected by the heat of the laser, it can be desirable to move a laser from the center of the component toward a first end to form a first portion of the wear resistant surface, then from the center of the component toward the second end to form the remainder of the wear resistant surface. The temperature of the component is thereby controlled to prevent negative modifications to the material properties of the component caused by excessive heat.

Typically, the laser can be maneuvered in a linear direction within a housing or sleeve, such as by using a mechanical and/or robotic apparatus, while the housing or sleeve is rotated, to form the hard facing layer throughout the desired portion of the interior of the housing or sleeve. Other methods are also usable, such as moving the housing or sleeve in both a linear direction and a rotational direction while the laser remains stationary.

Figure 2:
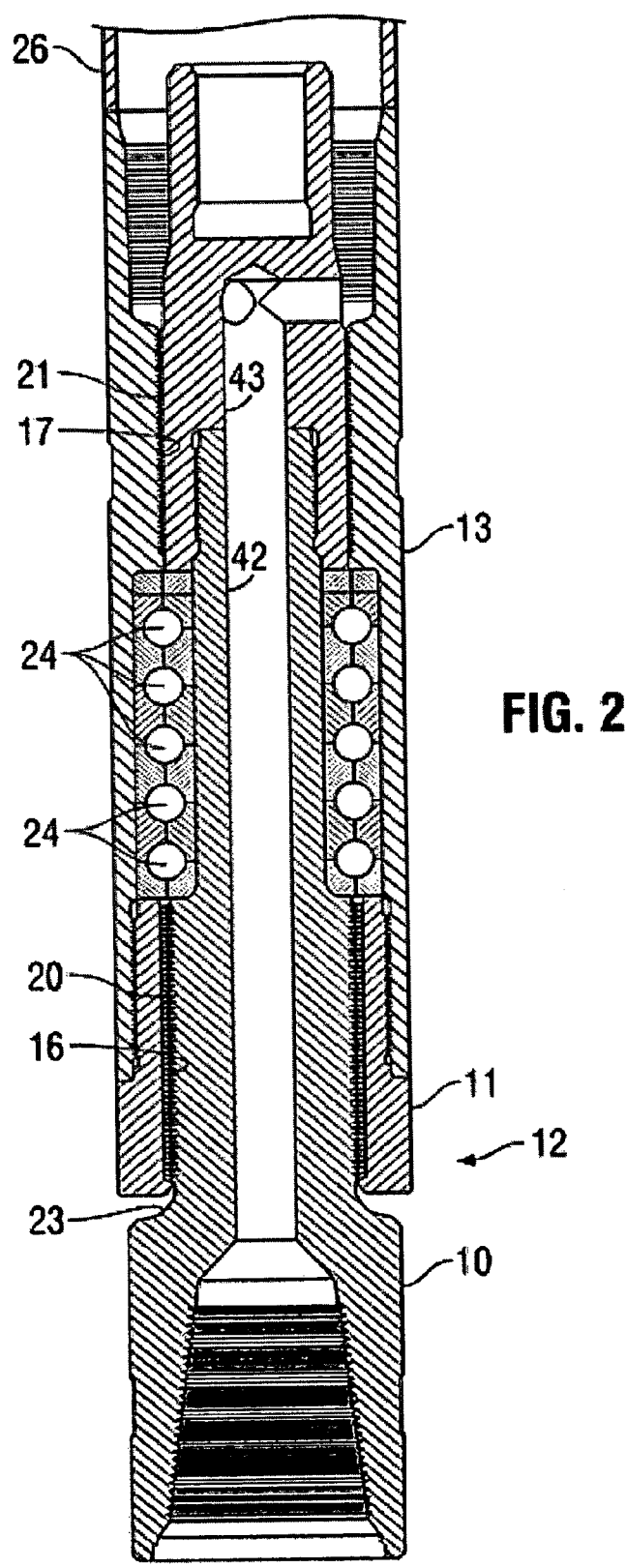
FIG. 2 depicts a cross-sectional view of a mandrel within a lower housing of a mud motor, containing bearings produced through use of the present embodiments.

Referring now to FIG. 2, a cross-sectional view of an embodiment of a mandrel (42) within the bearing housing (12) of a mud motor is shown. The bearing housing (12) is shown having a first housing segment (11) threaded to a second housing segment (13). The mandrel (42) includes a mandrel extension (43) threaded thereto. The mandrel (42) is the rotational component of a mud motor, and has a first end (10) configured for attachment to a drill bit for drilling a well by imparting rotational force to the drill bit.

The mandrel (42) has an outer surface (23) with which a first lower radial bearing layer (16) and a first upper radial bearing layer (17) are integrated. The bearing housing (12) has a second lower radial bearing layer (20) integrated therewith, concentrically disposed about the first lower radial bearing layer (16). The bearing housing (12) further has a second upper radial bearing layer (21) associated therewith, concentrically disposed about the first upper radial bearing layer (17).

Each of the bearing layers (16, 17, 20, 21) has a hard facing surface (depicted in FIG. 1) formed thereon, such that the opposing surfaces of the lower radial bearing layers (16, 20) and those of the upper radial bearing layers (17, 21) abut during drilling operations for resisting wear as the mandrel (42) and first bearing layers (16, 17) rotate, while the bearing housing (12) and the second bearing layers (20, 21) remain stationary with respect to the mandrel (42) and first bearing layers (16, 17).

With the mandrel (42) inserted in the bearing housing (12), a cavity is defined between the upper and lower sets of radial bearing layers (16, 17, 20, 21), within which a plurality of thrust bearings (24) are disposed. The thrust bearings (24) transmit the axial load from a drill string (26) engaged with the bearing housing (12) via the mandrel (42) to a drill bit engaged with the mandrel (42).

In operation, the hydraulic horsepower of the drilling fluid causes the mandrel (42) to rotate, which imparts a rotational force to an attached drill bit, for boring a bore hole. The abutting hard facing surfaces of the bearing layers (16, 17, 20, 21) allow rotation of the mandrel (42) relative to the bearing housing (12) while minimizing abrasive wear there between. The radial bearings clutch radial forces and allow stabilization of the mandrel (42) relative to the housing (12) during drilling operations. These abrasive forces can be significant, as a typical mud motor can rotate at 100 to 300 revolutions per minute, or more, thus the improved durability of the radial bearings produced using the present methods is extremely desirable.

While these embodiments have been described with emphasis on the embodiments, it should be understood that within the scope of the appended claims, the embodiments might be practiced other than as specifically described herein.

What is claimed is:

1. A method for manufacturing a bearing, the method comprising the steps of:
providing a bearing housing comprising an inner surface;
providing a mandrel comprising an outer surface;
inserting a laser device into the bearing housing;
applying a fusible material to the inner surface and the outer surface;
projecting a laser to contact the fusible material using the laser device and maintaining the laser in a stationary angular relationship relative to the bearing housing while rotating the bearing housing, thereby using the laser to connect the fusible material to the inner surface and the outer surface to form a first hard facing layer disposed over the outer surface of the mandrel and to form a second hard facing layer disposed over the inner surface of the bearing housing, and wherein the step of projecting the laser additionally comprises maintaining the bearing housing and the mandrel at a temperature of 400 degrees Fahrenheit or less, throughout the hard facing process; and
positioning the second hard facing layer concentrically over the first hard facing layer to form a bearing.

2. The method of claim 1, further comprising the step of machining the first hard facing layer, the second hard facing layer, or combinations thereof, to form opposing hard facing surfaces.

3. The method of claim 1, wherein the fusible material comprises a powder comprising tungsten carbide, cobalt, nickel, silicon carbide, ceramic, other hard facing materials, or combinations thereof.

4. The method of claim 1, wherein the laser comprises an inner diameter laser.

5. The method of claim 1, wherein the step of applying the fusible material comprises projecting the fusible material under an inert gas.

6. The method of claim 1, wherein the bearing is a radial bearing.

7. The method of claim 1, wherein the bearing is a linear bearing.

8. The method of claim 1, further comprising the step of providing a male bearing insert disposed over the mandrel, wherein the male bearing insert comprises the outer surface, and wherein the step of applying the fusible material while using the laser comprises forming the first hard facing layer over the outer surface of the male bearing insert.

9. The method of claim 8, further comprising the step of providing a female bearing insert disposed over the male bearing insert within the bearing housing, wherein the female bearing insert comprises the inner surface, and wherein the step of applying the fusible material while using the laser comprises forming the second hard facing layer over the inner surface of the female bearing insert.

10. A method for manufacturing a bearing, the method comprising the steps of
providing a bearing housing comprising an inner surface;
providing a mandrel comprising an outer surface;
providing a first bearing layer mounted over the outer surface of the mandrel;
providing a second bearing layer disposed over the first bearing layer, wherein the second bearing layer is mounted in association with the inner surface of the bearing housing;
inserting a laser device into the bearing housing;
applying a fusible powder to the first bearing layer and the second bearing layer;
projecting a laser into the bearing housing using the laser device and maintaining the laser in a stationary angular relationship relative to the second bearing layer while rotating the bearing housing, the second bearing layer, or combinations thereof, thereby using the laser to connect the fusible powder to the first bearing layer and to the second bearing layer to form a first hard facing layer on the first bearing layer and to form a second hard facing layer on the second bearing layer, and wherein the step of projecting the laser additionally comprises maintaining the bearing housing and the mandrel at a temperature of 400 degrees Fahrenheit or less throughout the hard facing process; and
machining the first hard facing layer, the second hard facing layer, or combinations thereof, to form opposing hard facing surfaces.

11. The method of claim 10, wherein the fusible powder comprises tungsten carbide, cobalt, nickel, silicon carbide, ceramic, other hard facing materials, or combinations thereof.

12. The method of claim 10, wherein the step of applying the fusible powder comprises projecting the fusible material under an inert gas.

13. The method of claim 10, wherein the laser comprises an inner diameter laser.

14. The method of claim 10, wherein the bearing is a radial bearing.

15. The method of claim 10, wherein the bearing is a linear bearing.

16. A method for manufacturing a hard facing layer, the method comprising the steps of:
engaging a first bearing layer disposed in association with an inner surface of a bearing housing with a fusible material;
projecting a laser to contact the fusible material and maintaining a laser in a stationary angular relationship relative to the first bearing layer while rotating the first bearing layer, the bearing housing, or combinations thereof thereby using the laser to connect the fusible material to the bearing housing to form a first hard facing layer disposed over the first bearing layer, and wherein the step of projecting the laser additionally comprises maintaining the bearing housing and the mandrel at a temperature of 400 degrees Fahrenheit or less throughout the hard facing process.

17. The method of claim 16, wherein the fusible material comprises a powder comprising tungsten carbide, cobalt, nickel, silicon carbide, ceramic, other hard facing materials, or combinations thereof.

18. The method of claim 16, wherein the step of engaging the fusible material with the first bearing layer comprises projecting the fusible material under an inert gas.

19. The method of claim 16, wherein the laser comprises an inner diameter laser.

20. The method of claim 16, further comprising the step of engaging a second bearing layer disposed over a mandrel with the fusible material while using the laser to connect the fusible material to the mandrel to form a second hard facing layer disposed over the second bearing layer.

21. The method of claim 20, further comprising the step of machining the first hard facing layer, the second hard facing layer, or combinations thereof, to form opposing hard facing surfaces.

22. The method of claim 20, wherein the step of engaging the second bearing layer with the fusible material layer is performed simultaneously or alternatively with the step of engaging the first bearing layer with the fusible material.

23. The method of claim 20, wherein the first bearing layer and the second bearing layer have similar material properties.

24. A method for manufacturing a bearing, the method comprising the steps of:
providing a bearing housing comprising an inner surface and a mandrel comprising an outer surface;
providing a first bearing layer mounted over the outer surface of the mandrel;
providing a second bearing layer over the first bearing layer, wherein the second bearing layer is mounted within the inner surface of the bearing housing;
inserting into the bearing housing a plasma transferred arc device configured for insertion into the bearing housing;
applying a fusible powder to the first bearing layer and the second bearing layer;
using the plasma transferred arc device to heat the fusible powder and maintaining the plasma transferred arc device in a stationary angular relationship relative to the second bearing layer while rotating the bearing housing, the second bearing layer, or combinations thereof, thereby using the plasma transferred arc device to connect the fusible powder to the first bearing layer and to the second bearing layer to form a first hard facing layer on the first bearing layer and to form a second hard facing layer on the second bearing layer, and wherein the step of projecting the plasma transferred arc device additionally comprises maintaining the bearing housing and the mandrel at a temperature of 400 degrees Fahrenheit or less, throughout the hard facing process; and
machining the first hard facing layer and the second hard facing layer to form opposing hard facing surfaces.

25. A method for manufacturing wear resistant surfaces, the method comprising the steps of
providing a housing comprising an inner surface;
providing a matching member comprising an outer surface within the housing;
inserting a laser device into the housing;
applying a fusible material to the inner surface and the outer surface;
projecting a laser to contact the fusible material using the laser device and maintaining the laser device in a stationary angular relationship relative to the housing while rotating the housing, thereby using the laser to connect the fusible material to the inner surface and to the outer surface to form a first wear resistant surface disposed over the outer surface of the matching member and a second wear resistant surface disposed over the inner surface of the housing, and wherein the step of projecting the laser additionally comprises maintaining bearing housing and the mandrel at a temperature of 400 degrees Fahrenheit or less throughout the hard facing process.

26. The method of claim 25, further comprising the step of positioning the second wear resistant surface concentrically over the first wear resistant surface.

27. A method for manufacturing interior wear resistant surfaces, the method comprising the steps of:
providing a structure comprising an inner surface;
inserting a laser device into the structure;
applying a fusible material to the inner surface; and
projecting a laser to contact the fusible material using the laser device and maintaining the laser device in a stationary angular relationship relative to the structure while rotating the structure, thereby using the laser to connect the fusible material to the inner surface to form a wear resistant surface disposed over the inner surface of the structure, and wherein the step of projecting the laser additionally comprises maintaining bearing housing and the mandrel at a temperature of 400 degrees Fahrenheit or less throughout the hard facing process.

28. The method of claim 27, wherein maintaining the laser device in the stationary angular relationship relative to the structure while rotating the structure comprises projecting the laser in a generally downward direction to prevent movement of the fusible material caused by gravity.

29. The method of claim 27, wherein applying the fusible material to the inner surface comprises projecting the fusible material toward the inner surface under an inert gas.

* * * * *